United States Patent [19]

Wood

[11] Patent Number: 4,583,487
[45] Date of Patent: Apr. 22, 1986

[54] METHOD AND APPARATUS FOR CYCLICALLY DISPENSING LUBRICANTS AND COLORINGS FOR USE IN INJECTION MOLDING MACHINES

[76] Inventor: Horace G. Wood, 31 Leedale Rd., Webster, N.Y. 14580

[21] Appl. No.: 662,650

[22] Filed: Oct. 19, 1984

Related U.S. Application Data

[63] Continuation of Ser. No. 528,823, Sep. 2, 1983, abandoned.

[51] Int. Cl.[4] .............................................. B05B 1/00
[52] U.S. Cl. ..................................... 118/308; 427/180; 366/150; 366/181; 406/74; 406/181; 425/130
[58] Field of Search ................ 427/180, 222; 118/308; 425/130, 584; 406/74, 181; 366/150, 181

[56] References Cited

U.S. PATENT DOCUMENTS

| | | | |
|---|---|---|---|
| 2,393,452 | 1/1946 | Bailey et al. | 18/12 |
| 2,443,289 | 6/1948 | Bailey | 18/12 |
| 3,236,929 | 2/1966 | Jupa et al. | 264/238 |
| 3,272,396 | 9/1966 | Neville | 222/636 |
| 3,344,212 | 9/1967 | Francis | 427/222 X |
| 3,577,492 | 5/1971 | Welsh et al. | 264/120 |
| 3,619,462 | 11/1971 | Dines | 264/300 |
| 3,938,469 | 2/1976 | Nau | 118/303 |
| 3,972,665 | 8/1976 | Andrews | 425/205 |
| 3,978,036 | 8/1976 | Pollard | 264/140 |
| 4,184,258 | 1/1980 | Barrington et al. | 222/636 |
| 4,356,139 | 10/1982 | Rowland et al. | 264/174 |

OTHER PUBLICATIONS

Dialog Report, Plastics World, Jul. 1983, p. 94.

Primary Examiner—Shrive P. Beck
Attorney, Agent, or Firm—Martin LuKacher

[57] ABSTRACT

A method and apparatus for dispensing and dispersing dry, powdered lubricants and/or coloring, such that it completely coats granules of plastic to be lubricated and/or colored, by dispensing amounts of the coating material from a container to a region from where a timed blast of air transports said coating material through a tube communicating with the throat of a hopper containing said plastic granules, all being operated in a coordinated fashion which may be varied to increase or decrease rate and/or amount of delivery of the coating material.

15 Claims, 5 Drawing Figures

METHOD AND APPARATUS FOR CYCLICALLY DISPENSING LUBRICANTS AND COLORINGS FOR USE IN INJECTION MOLDING MACHINES

This is a continuation of application Ser. No. 528,823, filed Sept. 2, 1983, now abandoned.

DESCRIPTION

This invention relates to the field of injection molding of plastics. In this field, plastic granules, most commonly in pellet form, are heated to their melting point and the resulting liquid is injected into a die by means of an auger-like device. Most pellets are colorless. In addition, when ground and heated, the pellets cause a significant level of friction to be built up in the auger decreasing the efficiency of the molding process. As a result, it is known in the art that coloring additives and/or lubricants may be added to the pellets, either as the pellets are formed or prior to their melting.

A variety of means exist for adding coloring or lubricants. Andrews, U.S. Pat. No. 3,972,665, provides for a screw-like means to dispense additives directly into the middle of the throat of the hopper and onto the plastic pellets. Bailey, U.S. Pat. Nos. 2,393,452 and 2,443,289, provides for adding lubricants directly onto the die at high pressure to lubricate the die without contaminating the heated plastic. Rowland, U.S. Pat. No. 4,356,139, provides for spraying of liquid lubricants upwardly, under high pressure by a plurality of nozzles onto pellets before and while entering a heating means. In other patents, means are provided to mix lubricants and/or colorings with the material used to form the pellets producing a pellet that incorporates the added matter. See U.S. Pat. Nos. 3,236,929; 3,577,492; 3,619,462; and 3,978,036.

None of these, however, offer means to apply said colorings or lubricants as dry powders or coatings by air transport in a cyclic, yet adjustable, pattern. As such, it is an object of this invention to provide an improved method in which dry powder is delivered by air transport to the throat of a hopper used in the injection molding of plastic to completely coat, as much or as little as desired, the plastic pellets passing therein.

It is another aspect of this invention to provide improved dispensing apparatus by which amounts of powder to be dispersed are slidably delivered from the first point or position, which may be at the outlet of a container, to a second point or position at which a blast of air transports said powder through a tube, delivering it to the throat of the hopper.

A further aspect of this invention is to provide means in the dispensing apparatus for slidably delivering said powder from the first to the second of said points.

An additional aspect is to provide means in the dispensing apparatus which synchronize the slidable means with the blast of air and further provide for adjustment of the rate at which the air blast providing means and the slidable means operate.

A latter aspect of the invention provides means by which the amount of powder delivered to said slidable means may be varied.

These and other objects, features, aspects and advantages of this invention as well as the presently preferred embodiment thereof will become more apparent as the discussion continues in connection with the accompanying drawings in which FIG. 1 is a schematic diagram of the dispensing apparatus embodying the invention;

Figure 1:
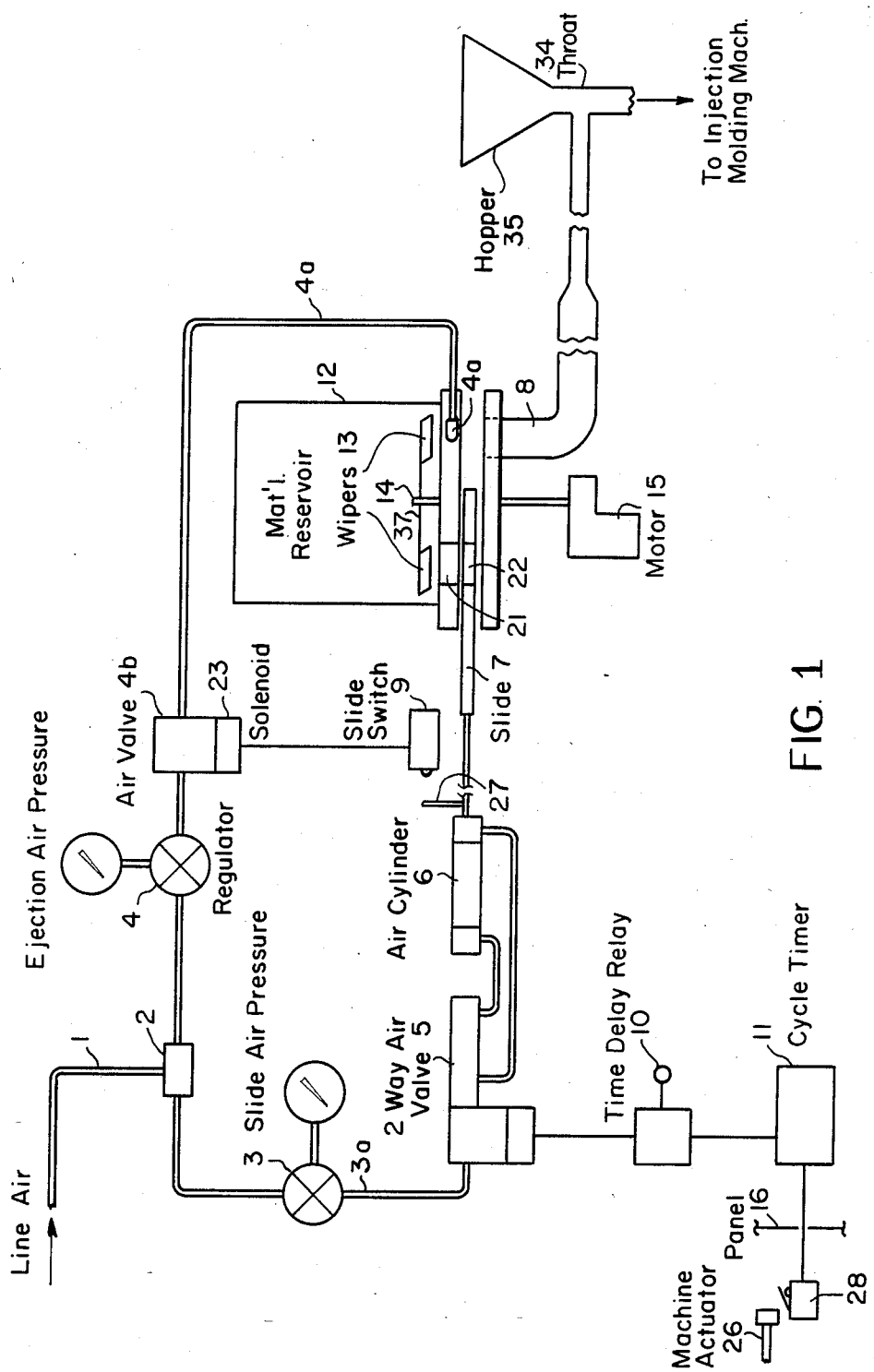

Referring to FIG. 1, pressurized air is supplied via line 1 to the apparatus. The pressure may suitably be between 80 and 150 psi. The air supply is diverted at junction 2 between a regulator 3 for slide operation and a regulator 4 for air blast operation for transporting the powder to the throat 34 of a hopper 35 containing granules of thermoplastic material to be melted and molded for injection in an injection molding machine. The air supply line 3a communicates with a two-way air valve 5 which in turn operates a pneumatic cylinder 6. This cylinder, when injected with air, moves a slidable, rectangular delivery device (a "slide") 7 to the right, from a first position, shown in FIG. 1, to the second position. Operation of the two-way air valve 5 in the opposite direction withdraws the pneumatic cylinder 6; thus withdrawing the slide 7 back to the first position. Air supply line 4a communicates with the slide 7 and a delivery tube 8 at the second position, and provides a blast of air in a downward direction. The tube 8 then communicates with the throat 34 of the hopper 35 on an injection molding device (not shown).

A switch 9 is tripped by a switch actuator 27 when said slide 7 is pushed to the second position. The switch 9 then activates air supply valve 4b, providing the air blast when the slide 7 is in the second position. A time delay relay 10 and pulse timer circuit 11 function to activate and control the rate of operation of the pneumatic air cylinder 5. The timer 11 may be controlled from an external machine, e.g. in response to the displacement of the auger of the injection molding machine via a machine actuator 26 which operates a cycle switch 28. The timer 11 may be a counter having means to output a control pulse at different counts or number of closures of the cycle switch 28. Alternatively an internal clock in the timer with a variable rate clock may be used to drive the counter. Controls of the clock rate and delay in the time delay relay 10 are provided at 29 and 30 on the front panel 16 and on the time delay relay 10 respectively.

There is a generally cylindrical reservoir or container 12 to which the powder may be added. Within reservoir 12 there is a wiper mechanism 13, or more specifically two wipers, radially mounted on an arm 37 which is connected to a central shaft 14. The wipers extend downward to wipe across the bottom of the container and across the outlet hole 21. The shaft 14 extends downwardly to a motor 15 which drives the wipers 13.

Figure 2:
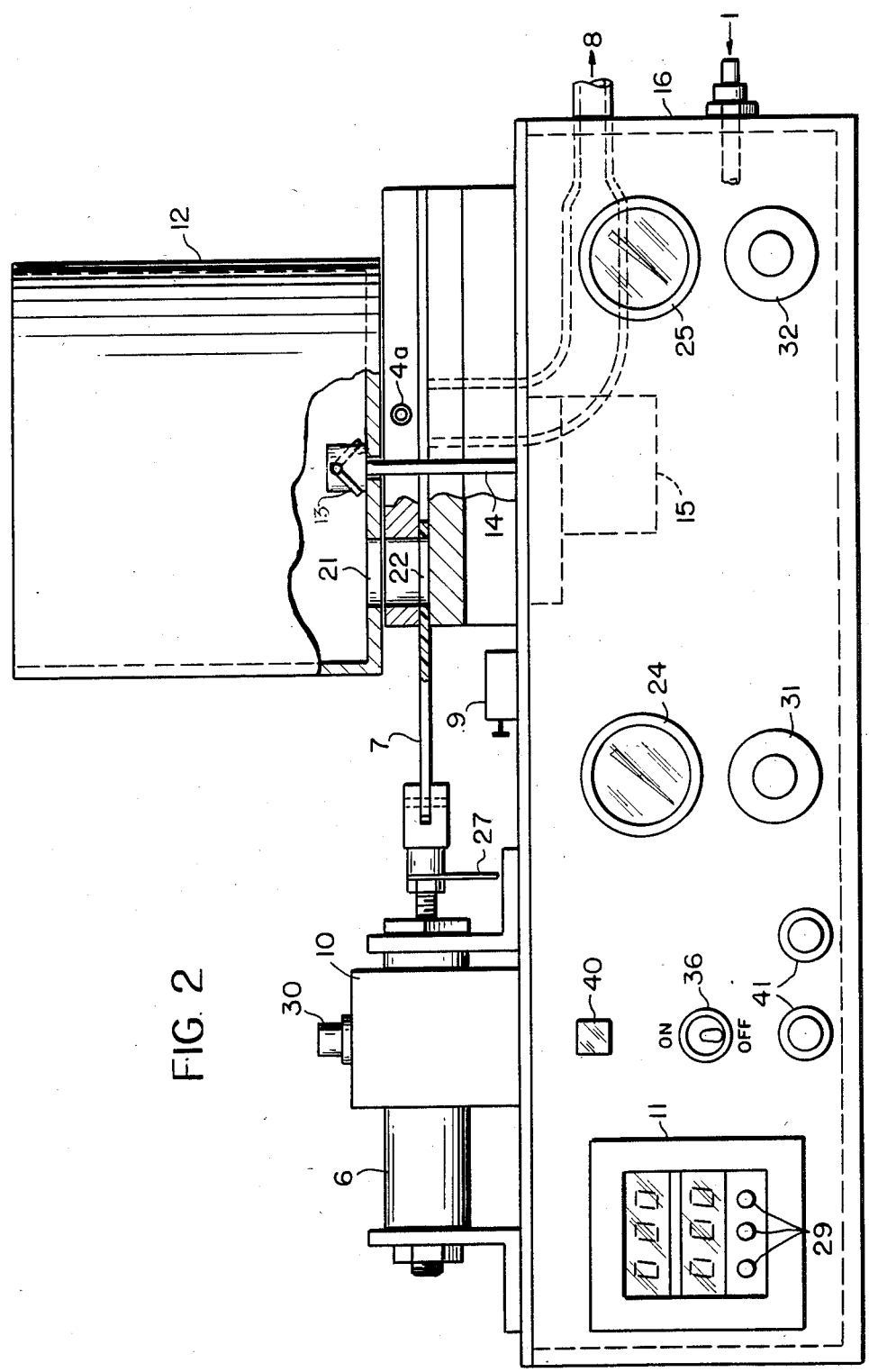
FIG. 2 is an elevational view, partially in section, of the apparatus shown in FIG. 1.

FIG. 2 shows the relationship between the cylindrical container 12, wipers 13, shaft 14 and motor 15. The cylindrical container 12 is mounted above a lower control box 16 which contains the pressure regulators 3, 4 (shown in FIG. 1), associated pressure gauges 24, 25 and control knobs 31, 32 respectively, supply lines 3a, 4a, air valve 5, motor 15, timer 11 and associated controls 29, an on/off power switch 36, indicator lamp 40 and associated fuses 41. See FIG. 2. The cylindrical container 12 is mounted sufficiently above the box 16 as to provide room for the slide 7 and its mounting in a dual block-like arrangement 17 through which tube 8 traverses. See FIG. 4. The block arrangement 17 is fixedly attached to and includes an upper block 18, between which slide 7 moves. Bolts 19 provide the attachment. Air supply line 4a communicates through upper block 18 to the second position region 20.

It may be desirable to permit the volume of the powder to be varied. This can be done by a movable and adjustable insert 38 (see FIG.4A) in the slide 7 which changes the size (diameter) of the hole 22. The upper block 18 then is preferably domed to provide a passage for the air blast even when the insert extends over the air line 4a in second position 20. The position of the insert 38 is set by a bolt 39. The thickness of slide 7 is greater than the slide shown in FIG. 2 when the movable and adjustable insert 38 is used therein.

Figure 3:
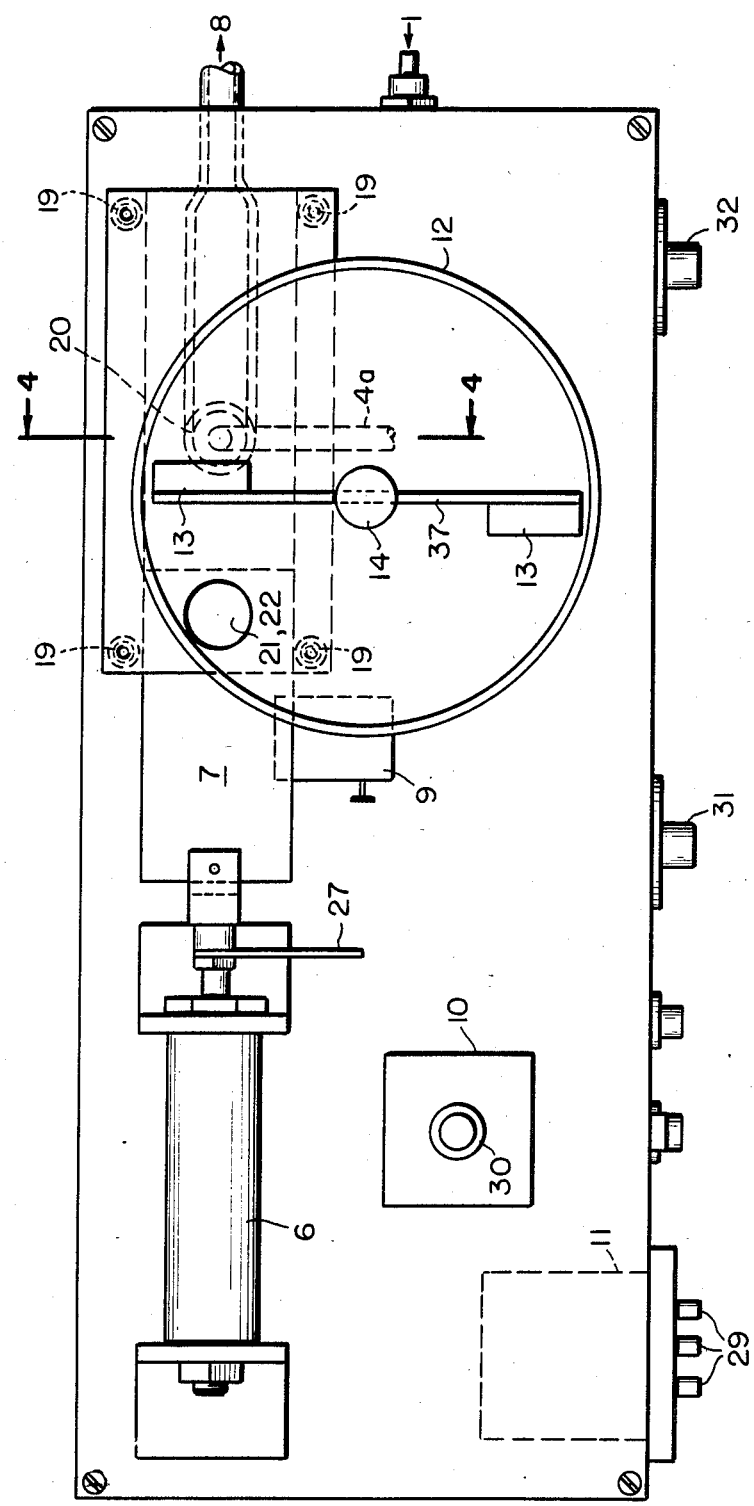
FIG. 3 is a plan view of the apparatus shown in FIG. 2.
Figure 4:
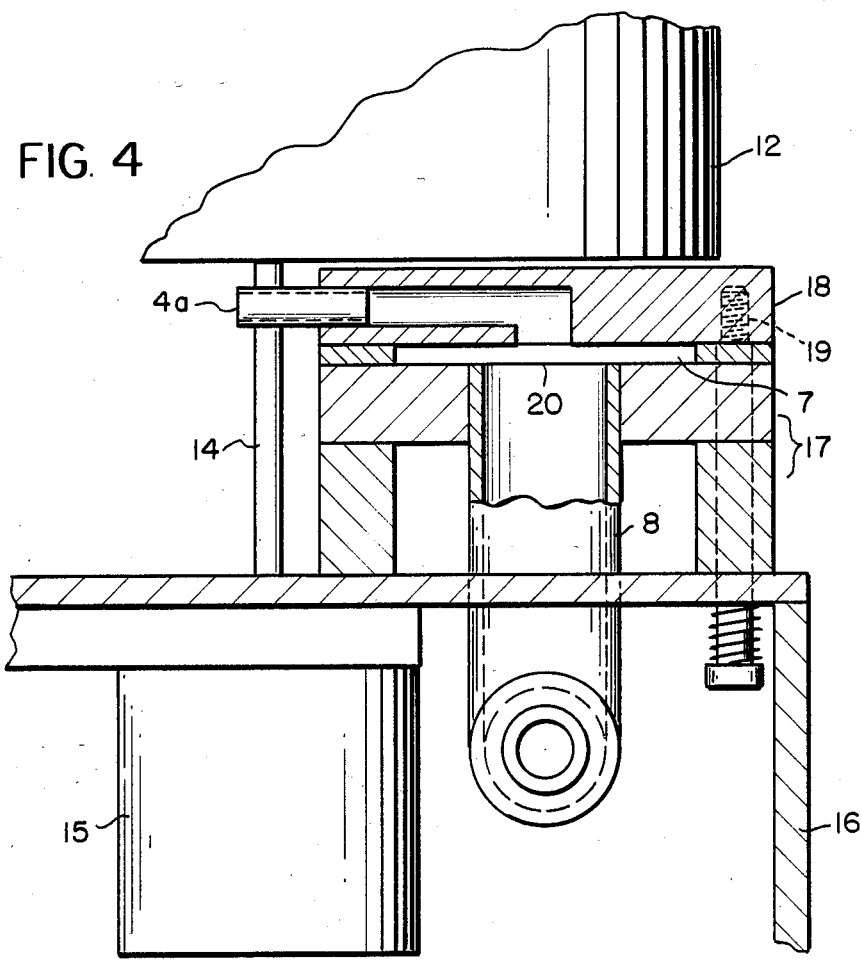
FIG. 4 is an enlarged sectional view taken along the line 4—4 in FIG. 3.
Figure 4A:
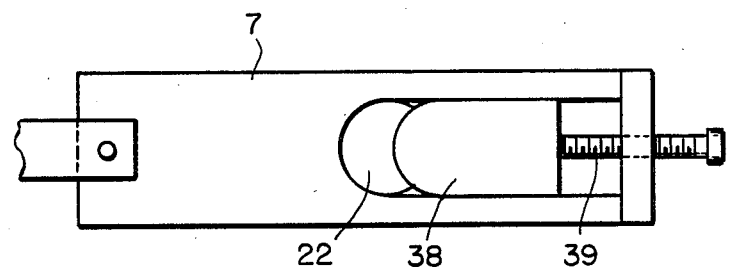
FIG. 4A is a plan view of a modified slide.

Referring to FIG. 3 and FIG. 4, the location of cylindrical container 12 is shown with respect to its bottom opening 21 which coincides with an identical in diameter opening 22 in slide 7. Slide 7 is shown in the first position.

When activated, the pneumatic cylinder 6 pushes the slide 7, with the opening 22 filled with powder from container 12, thus forming a "charge", to the right to the second position to define region 20. In so doing switch 9 is tripped which operates solenoid 23 (see FIG. 1) associated with valve 4b and causes a blast of air to be delivered via line 4a to, when the slide is in said second position 20 from above the region and therefore opening 22 at a time which coincides with said slide reaching said second position. Alternatively, a second timer (not shown), also actuated by the cycle switch 28, may be used to actuate the solenoid 23 and initiate the air blast at a time when the auger is returning to its return position. The charge is thus blown down and out of the opening 22 (see also FIG. 4) out through tube 8 to the throat of the hopper at an adjustable pressure of between 0 and 75 psi controlled by the regulator 4 which may be observed at pressure gauge 24. The slide air pressure is also controlled by the regulator 3 and may be observed at gauge 25. Controls 31 and 32 for the regulators 3 and 4 are on the front panel 16.

Slide 7 returns to the first position to receive another charge once the openings 21 and 22 are realigned. During the transition between the first and second positions, the opening 21 in the bottom of said cylindrical container 12 is closed by the solid portion of said slide 7. In the first position, powder does not fall out the bottom of said opening 21 because it is closed by the upper portion of said lower block 17 until it reaches said second position.

From the foregoing description it will be apparent that there has been provided a unique system for repeatedly delivering variable amounts and rate of powder to the throat of a hopper, used in injection molding, by air transport. Variations and modifications in the herein described apparatus, within the scope of the invention, will undoubtedly suggest themselves to those skilled in the art. Accordingly, the foregoing description should be taken as illustrative and not in a limiting sense.

I claim:

1. Apparatus for dispensing and dispersing dry lubricants or coloring powder into thermoplastic material prior to injection molding thereof for adding as by coating the material with the powder while the material is in a hopper of a machine in which an injection molding is carried out in cycles, said apparatus comprising: a reservoir for containing said powder, and having an outlet opening; slide means actuable for removing a dispensed amount of said powder from said reservoir outlet opening and depositing said dispensed powder at the confluence of an air port and delivery tube; said tube communicating with the throat region of said hopper wherein a volume of said material is retained between said cycles; means for coordinating the actuation of said slide means and the application of air to said air port to transport said dispensed amount of powder and to disperse said powder uniformly throughout said volume of said material.

2. The apparatus in claim 1 wherein said reservoir to contain said powder has a hole in the bottom thereof providing said outlet opening, said hole being displaced from the center of said reservoir for allowing said powder to exit from said reservoir.

3. The apparatus in claim 2 wherein said reservoir has wiper means rotatably mounted in said reservoir and movable over said exit hole for positively displacing said powder from said reservoir.

4. The apparatus in claim 1 wherein said slide means at said opening of said reservoir is a rectangular body whose major dimensions are length and width and minor dimension is height, having an opening movable between first and second positions respectively, in coincidence with said opening in said reservoir from which said powder is dispensed thereby filling said slidably mounted opening and in coincidence with said confluence.

5. The apparatus in claim 4 wherein said slide means has a movable and adjustable insert thereby allowing changes to be made in the size of said opening in said slide.

6. The apparatus in claim 1 wherein means are provided to move said slide means from a first position coincident with said outlet opening to a second position between said air port and said tube and then to return said slide means to said first position.

7. The apparatus in claim 6 wherein said slide means is driven by a pneumatic cylinder.

8. The apparatus in claim 6 wherein a two-way pressurized gas valve operated by said timing means for allowing gas into said delivery means to motivate said delivery means, and to close said valve to stop said delivery means, and to reverse said valve for reversing the direction of movement of said delivery means, and a one-way gas valve activated by said switch, allowing pressurized gas into said region and then closing said one-way valve.

9. The apparatus in claim 6 wherein means are provided to set the rate at which said blast of powder is delivered to said throat of said hopper, to coordinate the movement of said slide means to said second position with said blast of air, and to set the amount of powder delivered to said opening in said rectangular opening per cycle, said means including means to trigger said means to move said slide means from said first position to said second position and vice versa, and means to provide a blast of air through said air port when said slide means is at said second position.

10. The apparatus in claim 1 wherein means are provided to receive pressurized air from an external source, to adjust that air pressure to a desired level, and to supply a blast of said air at the moment when said slide means is positioned to deposit said amount of dispensed powder at said confluence of said air port and delivery tube.

11. The apparatus in claim 1 further comprising means for counting the injection molding cycles, and means for controlling the number of actuations of said slide means and application of air to said air port in accordance with the number of counts.

12. Apparatus for dispensing powder into a body of granular material which travels through a passage comprising a region having an outlet communicating with said passage, an inlet for compressed gas, and a powder delivery inlet, means for delivering discrete quantities of said powder into said region, means for applying a blast of pressurized gas to said inlet for blowing said powder out of said region into said body of granular material in said passage, said means for delivery of powder to said region and said means for applying said blast of gas being synchronized by timing means which activate said delivery means and means for activating said blast of pressurized gas such that upon arrival of said delivery means at said region said blast of gas occurs, and said activating means comprising a switch tripped by operation of said delivery means.

13. Apparatus for dispensing powder into a body of granular material which travels through a passage comprising a region having an outlet communicating with said passage, an inlet for compressed gas, and a powder delivery inlet, means for delivering discrete quantities of said powder into said region, means for applying a blast of pressurized gas to said inlet for blowing said powder out of said region into said body of granular material in said passage, said means for delivery of powder to said region and said means for applying said blast of gas being synchronized by timing means which activate said delivery means and means for applying said blast of pressurized gas such that upon arrival of said delivery means at said region said blast of gas occurs, a two-way pressurized gas valve operated by said timing means for allowing gas into said delivery means to motivate said delivery means and close said valve to stop said delivery means, and reverse said valve for reversing the direction of said delivery means.

14. The apparatus in claim 13 wherein said delivery means comprises said two-way pressurized gas line, which communicates with one end of a pneumatic cylinder, the other end of which communicates by a fixed shaft to one end of a rectangular form, and a rectangular form, which contains a hole at the opposite end, whose minor dimension is height.

15. The apparatus in claim 14 wherein the hole in said rectangular form is filled with said powder from a reservoir forming a charge said form and charge being moved by operation of said delivery means to said region where said charge meets with said compressed gas inlet forming a blowing chamber.

* * * * *